Oct. 29, 1968  J. BACHI, JR  3,408,154

SPINNER FOR A LIQUID FUEL BURNER

Original Filed Feb. 17, 1966  2 Sheets-Sheet 1

INVENTOR.
John Bachi, Jr.
BY
John F. Dunn
ATTORNEY

INVENTOR.
John Bachi, Jr.

United States Patent Office 3,408,154
Patented Oct. 29, 1968

3,408,154
SPINNER FOR A LIQUID FUEL BURNER
John Bachi, Jr., Hammond, Ind., assignor to Standard Oil Company, Chicago, Ill., a corporation of Indiana
Continuation of application Ser. No. 536,506, Feb. 17, 1966, which is a continuation-in-part of application Ser. No. 366,397, May 11, 1964. This application Feb. 17, 1967, Ser. No. 628,202
1 Claim. (Cl. 431—353)

ABSTRACT OF THE DISCLOSURE

A spinner apparatus having a plurality of plates, the first plate having a first side and a second side, the first side having extended vanes, an intermediate plate spaced from the second side of the first plate by a spacer means having openings for the dispersal of fuel between the first plate and the intermediate plate. The extended vanes on the first side of the first plate may be substantially radial and straight, or curved in the direction of rotation, or twisted, or curved in the direction of rotation and twisted.

---

This is in part a continuation of application S.N. 536,506, now abandoned, filed Feb. 17, 1966 which is a continuation-in-part of application S.N. 366,397, now abandoned, filed May 11, 1964.

This invention relates to that general type of oil-burning burner which uses a mechanical spinner that receives the oil from a source of supply and throws it outwardly by centrifugal force through a surrounding combustion chamber so that it is directed onto an annular wall of high capillarity which receives and absorbs the droplets thrown off by the spinner and in which the droplets spread to provide a large area for rapid evaporation and burning of the oil.

Burners of this type have gone into wide commercial use as a lightweight portable space heater, especially by building contractors and the like who need a smokeless burner that will develop a high heat at a relatively low cost.

In the accompanying drawings, a burner which as particularly designed for domestic heating is disclosed and in these drawings.

Figure 1:
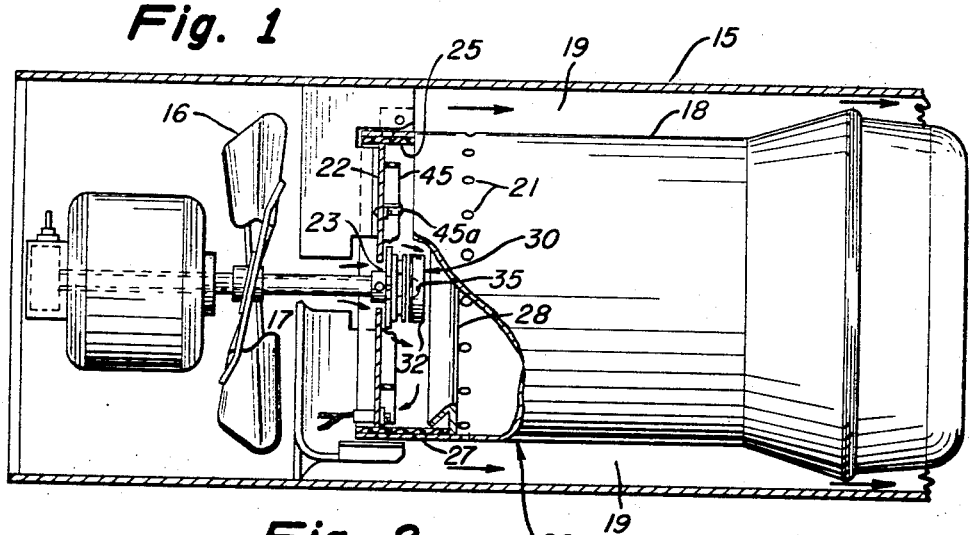
FIG. 1 is an axial sectional view through a burner embodying the present invention.

With my improved burner, it is possible to obtain cleaner and more efficient combustion without the use of a stack or chimney and, therefore, it is particularly adaptable to heaters where stacks cannot be used.

The burner of this invention is shown in the drawings as having its spinner axis horizontal but it is to be understood that the burner will function equally as well with with the spinner axis in an upright position.

Prior art burners using mechanical spinners to receive oil from a source of supply and throw it outwardly by centrifugal force into a surrounding combustion chamber have employed spinners incorporating fans and a plurality of fan vanes. In the prior art, however, it has been considered essential to control the size of the fan vanes by preventing them from extending beyond the periphery of the spinner in order to achieve the most efficient combustion. Quite unexpectedly, according to my invention it has now been found that an improved burner for burning liquid fuel contains a spinner having a plurality of fan vanes extending generally radially beyond the periphery of the spinner. When a liquid fuel is burned in a burner incorporating the improved spinner of my invention more efficient combustion results and surprisingly, essentially smoke-free combustion takes place even when burning fuels of high gravity.

It is not often that a significant advance in the art is made by means of a relatively uncomplicated physical change. However, such does happen to be the case with my invention, as evidenced in comparisons which follow showing that whereas prior art burner performance is marginal even when employing preferred commercial fuels, burners incorporating the improved mechanical spinner of invention give excellent performance with the full range of commercial fuels.

The burner is shown in FIG. 1 disposed within a tubular outer casing 15 which may be suitably connected to a stack or vent when incorporated in a domestic furnace. A fan 16 is disposed within the casing 15 coaxial therewith at the inlet portion thereof being mounted on a shaft 17 which is preferably driven by an electric motor.

Disposed within the casing 15 in spaced concentric relationship therewith toward the outlet thereof is the combustion chamber 18 which is mainly of tubular form. Since it is of smaller diameter than the casing 15 an annular air-passageway 19 is provided between the wall of the combustion chamber and the casing 15. The fan 16 is of suitable form to draw air into the casing 15 and force it toward the outlet of the casing through the annular space 19 and the combustion chamber 18.

The burner is indicated generally at 20 and is concentrically disposed within the combustion chamber 18 at the inlet end thereof. Just beyond the burner 20, the wall of the combustion chamber is provided with a row of angularly spaced openings 21 extending therethrough and disposed at closely spaced angular positions around the combustion chamber. These openings are for supplying secondary air for combustion, which comes from the fan 16 through the annular space 19.

The inlet end of the combustion chamber is provided with a disc or back plate 22 which substantially closes it except that it is provided with an air inlet opening 23. This opening 23 serves as the primary air metering opening through which the main supply of primary air is supplied to the burner 20 by the fan 16. The shaft 17 extends forwardly through the opening 23 and it will be noted that this shaft is hollow for conducting the fuel oil to a supply of which it may be suitably connected.

Figure 2:
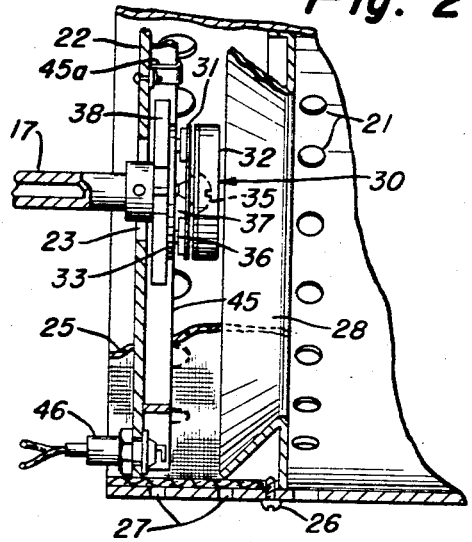
FIG. 2 is a partial enlarged axial sectional view showing a non-absorbent baffle ring and associated annular absorbent wall.

The burner 20 includes the annular absorbent ring or burner wall 25 fitted snugly within the combustion chamber wall at the lower or inlet end thereof as shown best in FIG. 2. It may be suitably fastened in position as by means of the screws 26. The wall 25 is made of a suitable liquid-absorbant, heat-resistant material of high capillarity. It may be of various materials such as ceramic paper or felt.

In addition, the annular absorbent wall may be made of metal which is composed of short "fibers" or filaments of metal, such as stainless steel, which are arranged in a layer similar to felt. However, various other metals or alloys may be used. In forming a body of such material, the filaments are arranged in a layer which is compressed and is then heated at a suitable temperature to cause fusion or welding of the overlying metal filaments bonded together. However, it is still porous with a density of 5% to 50% by volume, having interstices between the various filaments and actual pores extending through the material. For the purpose of this invention, I prefer a density of approximately 20%. The interstices provide capillary pockets in the mat for receiving and retaining the oil droplets when they reach the mat surface and the pores provide capillary openings for receiving and retaining the oil as well as openings through which air for combustion may be forced. The mat is also very temperature-resistant since it contains only metal. For the purpose of this invention, it should withstand a temperature of 1500° F. Furthermore, even though it is porous and of low density, it still has sufficient physical or structural rigidity and strength that it is free standing or free supporting to permit it to be used as the annular wall itself in the burner without backing it up with a plate or other backing structure.

As previously indicated, the wall 25 is made of a mat of metal filaments which are combined into felt-like material. The material is preferably made of overlying filaments which are pressed together and welded or fused together by heating to a suitable temperature without heating to such a high temperature that the physical structure of the filaments will be destroyed. The filaments will not be pressed together too tightly so as not to destroy the capillary pockets or interstices in the material. A density of less than 20% is desirable. The material will be porous and will have passages completely therethrough so as to permit passage of air from the chamber 19 through the material of the wall 25. Since the material is formed of metal, it will be heat-resistant and will adequately withstand temperatures up to 1500° F. The mat of felt-like metal will have sufficient rigidity that it will not be necessary to have a back-up plate to support it in its own plane.

Thus, a high degree of capillarity is present in the metal felt ring to provide lateral flow over the face of the ring in sufficient quantity to keep the ring well saturated with fuel. The high rate of evaporation from this wet ring provides a strong cooling action due to the latent heat of evaporation of the fuel. This cooling action tends strongly to prevent cracking of the fuel in the liquid state by lowering the temperature of the disc.

For effective and carbon-free operation, the metal felt ring is thin, not less than .026" and not more than .250" in thickness, and a thickness which I have found very satisfactory is .065".

For supplying part of the primary air for combustion, through the porous cloth wall, one or more rows of angularly spaced openings 27 are provided extending through the wall of the combustion chamber 18 at the wall 25. However, it will be noted that these openings do not extend through the absorbent porous cloth wall 25. Between the primary air openings 27 and the primary air openings 21 in the wall of the combustion chamber, is a flame-constricting, inwardly flared ring or collar 28.

Located centrally within the burner chamber formed by the annular wall 25 is an improved mechanical spinner indicated generally at 30. It is carried by the shaft 17 and is coaxial with the absorbent burner wall 25. The spinner is located directly forward of the plate 22 in association with the opening 23 therein as shown best in FIG. 2.

In a typical home water heater application said mechanical spinner will be approximately 2" in diameter. It is to be understood, however, that the length of the extended vanes will vary in relation to burner size.

Although this spinner is of the general structure disclosed above, it has been found that in some instances, as in a residential furnace where temperatures are higher, it is necessary to provide for a reduced temperature at the oil spinner or slinger so as to prevent evaporation of the oil before it leaves the surface of the spinner. If oil leaves the surface of the spinner in the vaporized state, it does not travel far from the spinner due to its low inertia as compared to the liquid oil, thus causing an overly rich area in the vicinity of the spinner which causes excessive carbon formation on the spinner.

As one means of preventing overheating of the spinner, the front or upper surface of the forwardmost or uppermost metal spinner disc 31 is completely covered with a thick disc or lamination 32 of thermal insulating material. This has been found to reduce very sharply the temperature at the rear or lower portion of the spinner due to the fact that metal at the forward side and which is attached to the rear side of the spinner is not exposed directly in the flame produced by the burner.

Specific embodiments of disc 32 are made of thermal insulating material such as Fiberfrax CH Board made by the Carborundum Company. This material is white to off-white, has a density of 30 to 40 lbs./cu. ft. and can withstand a temperature up to 2300° F. It has low thermal conductivity and has very good shock resistance. Two layers of this were used, each one ¼" thick. At 1500° F., this material has a thermal conductivity of approximately 1.2 B.t.u./hr. per sq. ft., per degree F., per inch of thickness.

Fiberfrax Paper made by the Carborundum Company can also be used. It is white, has a density of approximately 12 lbs. per cubic ft., may be used up to 2300° F. Several types of this paper are made. A preferred type is #970–J which is made up of Fiberfrax fibers synthetically produced from approximately 50% $Al_2O_3$ and $SiO_2$. Typically three layers cemented together with Fiberfrax cement are used, each layer being approximately ⅛ of an inch thick. The thermal conductivity of this paper is approximately 1.0 B.t.u./hr. per square ft., per degree F., per inch at 1500° F.

Another means of reducing the temperature of the spinner is in providing openings in the first plate 33 which is directly behind or beneath the second plate 31 and in spaced relationship thereto. These openings may be in spaced angular relationship around the center of the plate 33 concentric with a bolt 35 which holds the second plate 31 in spaced relationship to the first plate 33, a spacer means 36 spacing the two plates apart to provide the air space 37 therebetween. This allows air from the fan 16 to flow forwardly through the holes and outwardly through the space 37 between the two plates 31 and 33 to further aid in keeping the forward part of the spinner cooler and make the plates more effective as radiation shields.

Figure 6:
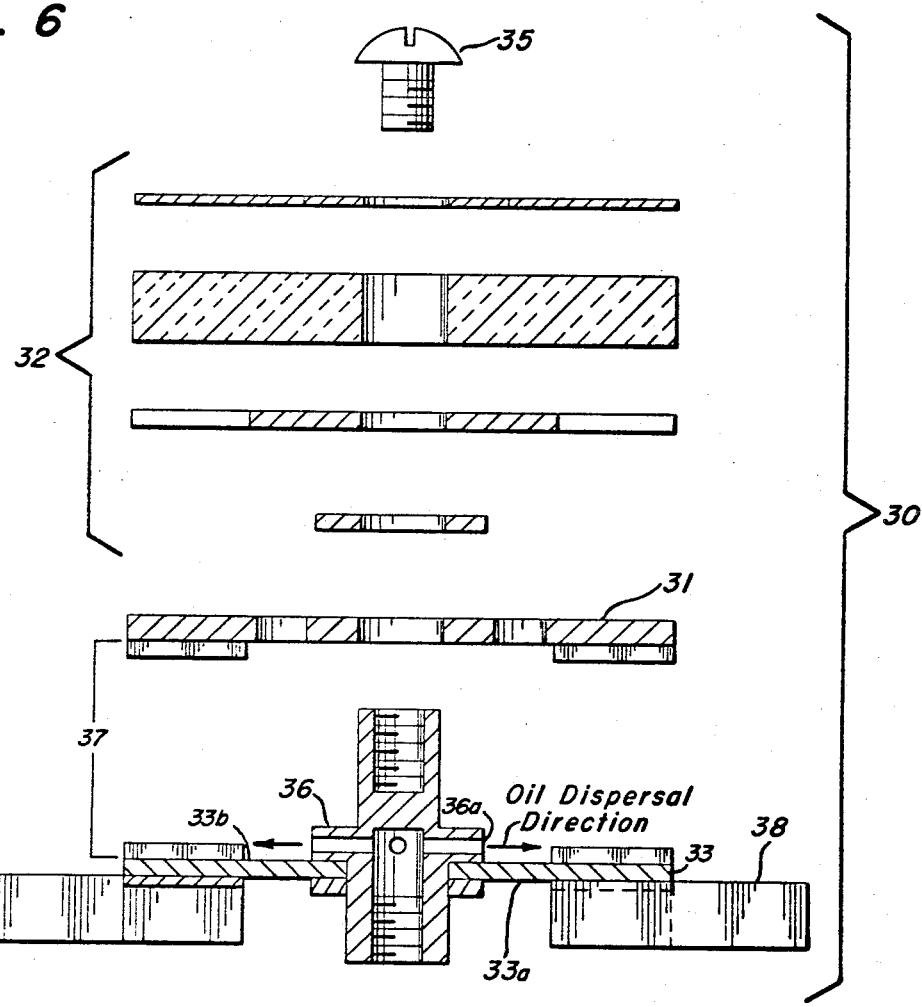
FIG. 6 is an expanded view of the spinner assembly partially in section.

Spacer means 36 shown in FIG. 6 is rigidly mounted centrally on the second side 33b of the first plate 33 opposite the vanes 38 which are mounted on the first side 33a of plate 33. Spacer means 36 communicates with hollow shaft 17 through openings 36a radiating outwardly through spacer means 36 in a plane substantially parallel to the second side 33b of plate 33. As spinner 30 rotates the openings 36a provide for the dispersal of fuel through space 37 between plates 33 and 31 along with the aforementioned air from fan 16. Thus, the fuel is dispersed in an unobstructed manner outwardly from spacer means 36 with the air in a plane defined by the openings 36a.

Figure 3:
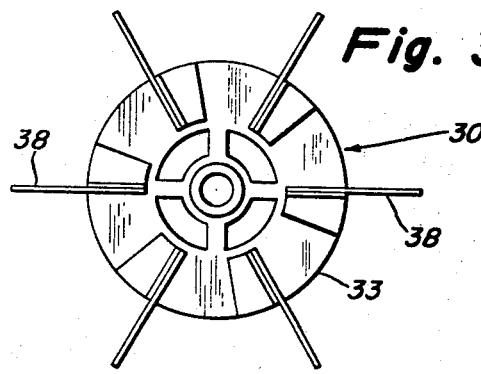
FIG. 3 is an enlarged view of a spinner showing a fan with vanes extending radially beyond the periphery of the spinner.
Figure 4:
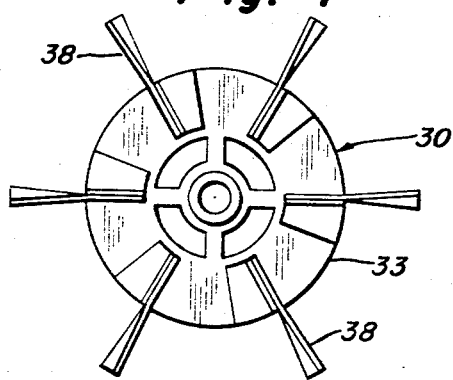
FIG. 4 is an enlarged view of a spinner showing a fan with twisted extending vanes.
Figure 7:
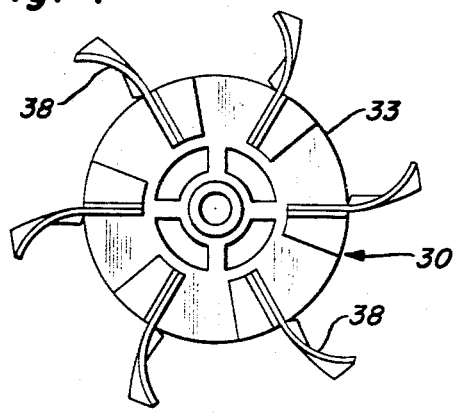
FIG. 7 is an enlarged plan view of a spinner showing a fan with extending vanes concave with respect to the direction of rotation, said vanes being twisted.

At the back of mechanical spinner 30 a plurality of fan vanes 38 are mounted on the first side of plate 33. These vanes extend outwardly generally in radial manner, a distance dependent upon the diameter of the burner. For example, in an application where the burner is 5 inches in diameter, and the spinner is 2 inches in diameter, the fan vanes will typically extend beyond the periphery of the spinner a distance of about ⅝ of an inch. The length and size of the extended fan vanes will vary, of course, in relation to the size of the burner, and various embodiments may be employed. Particularly advantageous embodiments of extended fan vanes are shown in FIGS. 3, 4, 5, and 7. In FIG. 3 the extended vanes are shown extending radially at right angles to the transverse plane of the spinner. In FIG. 4 the extended portions of the vanes are shown twisted at an angle with respect to the transverse plane of the spinner, and in FIG. 5 the extending portions of the fan vanes are shown to be at right angles to the transverse plane of the spinner and curved in the direction of spinner rotation. FIG. 7 portrays plate 33 having extended vanes 38 curved in the direction of rotation and twisted. Other effective embodiments may also be employed.

Improved mechanical spinners of my invention are particularly advantageous because the air currents thus generated promote better mixing of fuel with air. This permits completion of combustion in a smaller total volume and accordingly gives a shorter flame less likely to be carried to the outside of the burner. Furthermore, comparative tests show measurably significant improvements in burner performance when the improved mechnical spinner of my invention is employed. To demonstrate this point smoke rating and carbon dioxide content were meausred for two burners of the type described in U.S. 3,029,863 identical except that burner A incorporated a spinner known to the prior art in which the fan vanes did not extend beyond the periphery of the spinner, and burner B incorporated an improved mechanical spinner according to my invention wherein the fan vanes extended beyond the periphery of the spinner as shown in FIG. 3. The test stand set-up was a typical water heater installation operated at a nominal firing rate of 0.5 gallon of fuel per hour. Carbon dioxide concentrations were measured by Great Analysis. Smoke ratings were determined with a Von Brand Smoke Meter which passes a metered amount of stack gas through a filter paper. Test samples were then compared with standards of the Bacharach Oil Burner Smoke Scale. Table 1 compares the performance of burner A with burner B. A smoke rating of zero is perfect, and a commercial installation should consistently perform a smoke rating of less than two. Generally speaking, a high $CO_2$ concentration is better than a lower one. All $CO_2$ values reported, however, were within the acceptable range.

Smoke values for burner B averaged approximately 0.5 and showed no significant variation from the heaviest to the lightest fuel employed, and $CO_2$ values were generally high. Smoke values for burner A, on the other hand, were consistently high and averaged 3–4, indicating considerably less efficient combustion than in burner B.

TABLE 1

| A | | | B | | |
|---|---|---|---|---|---|
| Feed Gravity | Smoke | $CO^2$ | Feed Gravity | Smoke | $CO^2$ |
| 34.0 | ---------- | 6.7 | 25 | 1 | 6.3 |
| 34.0 | 6 | 6.7 | 25 | 0 | 7.4 |
| 34.0 | 2½ | 7.0 | 25 | 0.5 | 8.0 |
| 34.0 | 3.0 | 7.4 | 34 | 0 | 8.0 |
| 34.0 | 7.0 | 8.4 | 30 | 0 | 8.4 |
| 34.0 | 5.0 | 7.0 | 34 | 0 | 7.5 |
| 34.0 | 3.0 | 7.0 | 30 | 0.5 | ---------- |
| 34.0 | 2.5 | 6.5 | 34 | 0 | 6.6 |
| 34.0 | 2.0 | 7.0 | 30 | 0.5 | ---------- |
| 34.0 | 4.0 | 7.0 | 34 | 0.5–1.0 | 6.2 |
| 34.0 | 3.0 | 7.6 | 30 | 0.5 | 6.4 |
| 34.0 | 4.0 | 8.0 | 34 | 0.5 | 6.0 |
| 34.0 | 3.0 | 6.5 | 30 | 1 | 6.1 |
| 34.0 | 4.0 | 6.0 | 34 | 0 | 8.0 |
| 34.0 | 3.0 | 5.7 | 30 | 1.5 | 8.2 |
| 34.0 | 3.0 | 6.6 | 34 | 0 | 9.0 |
| 34.0 | 3.0 | 6.6 | 30 | 0.5 | 9.7 |
| 34.0 | 1.0 | 6.6 | 34 | 0 | 9.8 |
| | | | 30 | 3 | 11.5 |
| | | | 34 | 0 | 9.3 |
| | | | 30 | 0 | 9.4 |
| | | | 34 | 0.5 | 11.0 |

In operation the spinner receives oil by means of hollow shaft 17. Oil is thrown outward radially by centrifugal force and mixed with primary and secondary air for combustion. The absorbent ring on wall 25 will receive a thin line of droplets of oil thrown from the spinner particularly during burner start-up which droplets strike the wall along a radial line in the same plane as the openings 36a and spreads this oil out, toward the front and rear edges of the absorbent ring or wall, thereby increasing the wetted area of the ring and providing increased surface from which the oil can be evaporated more effectively. The fact that the ring or wall absorbs the oil quickly prevents accumulation of oil in the bottom of the burner chamber which is especially important in starting the burner. The capillary openings which extend through the absorbent metal felt wall, keep the absorbent material clean by bleeding air into the absorbent wall. This serves to prevent cracking of fuel in the absorbent material by supplying enough oxygen to the fuel immediately and also by cooling the oil in the wall. The secondary air holes downstream from the conical baffle introduce a final amount of air to complete combustion at the proper place along the flame. The conical baffle and the annular baffle or ring upstream therefrom serve to separate burning rich gases from the cold secondary air permitting them to mix gradually and toward the center of the combustion chamber away from the sides of the chamber where their impingement might cause carbon formation and the conical baffle especially serves to direct the burning gases toward the center of the chamber.

It has been found that under certain high temperature conditions, the main transverse planar stream of fuel droplets strike the wall or pad 25 in such heavy concentration that a band of carbon builds up at the surface of the wall in the transverse plane of the travel of the heavier droplets which is in the plane of the outlet space between the spinner plates 33 and 31. This is only true along a narrow band intermediate the axial extent of the absorbent wall 25. To prevent this build-up, a ring 45 of non-absorbent material is provided, such as metal, in the path of the main stream of heavy droplets thrown off by the spinner. However, this ring must be of a limited extent in an axial direction so that the satellite droplets will contact directly with the absorbent wall 25.

Studies of this burner have shown that the spinner throws off the oil as a concentration of droplets in the transverse plane of the outlet space 37 of the spinner 20 and that this center stream contains a relatively large percentage of the total volume of the discharged oil but that it is restricted to a quite narrow band. The same studies have also shown that in diverging transverse planes to either side of the main transverse planar stream of oil droplets, there are quite a number of less concentrated oil droplets which are called satellite droplets. The principle used and which has proven very beneficial in actual operation is to use a non-absorbent ring or band 45 which is fairly narrow in the axial direction radially between the spinner and the wall 25 so as to intercept the droplets in the main stream of droplets, to break them up and then to direct them onto the absorbent wall 25. The ring may be located and supported in various ways such as by the attaching clips 45A (FIG. 2) between it and the plate 23. This non-absorbent band may be $\frac{1}{16}$ to $\frac{1}{2}$ the exposed width, in an axial direction, of the wall 25 but is so located that a portion of the wall 25 extends below or behind the band and a portion extends forwardly or upwardly of the band. Also, the non-absorbent ring or band is disposed radially closer to the wall 25 than to the periphery of the spinner to provide a sufficient radial path for the oil droplets before they strike the non-absorbent band 45. It is preferred to have the band 45 closer to the wall 25 than to the spinner and the distance between the band 45 and the wall 25 should be about $\frac{1}{16}$ to $\frac{1}{4}$ the radius from the center of the spinner to the surface of the absorbent wall 25. Then when the heavy droplets strike the ring 45, they will be broken up into smaller droplets and be directed axially forwardly and rearwardly onto the surface of the porous wall 25 which extends axially forwardly and rearwardly to a substantial extent relative to the ring band 45.

Thus, it will be apparent from the diagrammatic illustrations in FIGURES 1 and 2 that by using a band 45 of the type indicated and located as indicated, the main stream of droplets thrown off by the spinner is broken up and dispersed and directed onto the absorbent wall, while at the same time the satellite droplets which are in streams in forwardly and rearwardly diverging planes on axially opposite sides of the main stream travel directly onto the wall 25 and will spread axially, as well as circumferentially, in both directions in the absorbent wall. Similarly, when the droplets bounce off the band 45, they contact the absorbent wall forwardly and rearwardly thereof and spread axially in both directions, as well as circumferentially, in the wall 25. Thus, formation of carbon on the absorbent wall by the concentrated droplets is prevented but at the same time, the lighter droplets are allowed to contact directly with the absorbent wall to provide for smooth quick starting or lighting of the burner as well as more efficient sustained burning without carbon formation. Tests have shown that interception of the total body of droplets thrown off by the spinner would make it practically impossible to light the burner since it is very difficult to evaporate fuel from a cool metal or other non-porous surface. Furthermore, with a non-porous surface only, with which the droplets would contact, oil would run off such surface to the bottom of the burner and the burner could not be lighted in the horizontal position which it does so easily when the droplets strike the absorbent wall 25. Any suitable lighting means may be employed. For example, an ignition spark device 46 may be provided in the burner directly adjacent the exposed surface of the wall 25.

The non-absorbent surface which interrupts the travel of the main stream of droplets may take various forms in addition to that of the continuous band or ring 45 shown in FIG. 1 and 2 and described above. For example, the band or ring instead of providing a continuous surface may be provided with angularly spaced openings or spaces that permit a certain portion of the droplets of the main stream to contact directly with the wall 25, or the material from the openings formed in the ring may be upturned about 45° and extend in the direction of rotation of the spinner so as to provide baffle tabs which effectively engage the droplets from the spinner which are thrown off at approximately 45° from a strictly radial direction.

In addition to extending the fan blades on spinner 30 as shown in FIG. 3 an embodiment of the invention was tested wherein the extending portion of the blades were twisted as shown in FIG. 4. Under conditions the same as those reported with respect to data in Table 1 the following smoke ratings and $CO_2$ concentrations were obtained:

| Smoke: | $CO_2$ |
|---|---|
| 1 | 10.6 |
| Trace | 11.3 |
| 0 | 9.5 |

Figure 5:
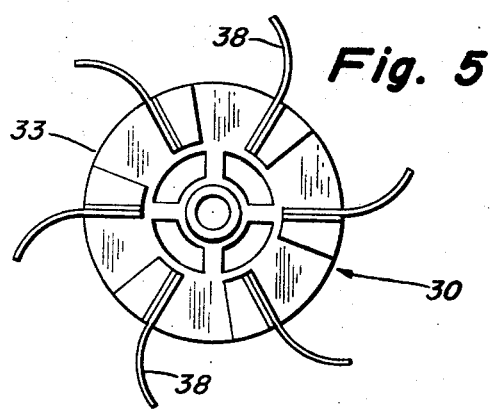
FIG. 5 is an enlarged view of a spinner showing a fan with extending vanes concave with respect to direction of rotation.

Also when the extended blades were curved as shown in FIG. 5, the following smoke ratings and $CO_2$ concentrations were obtained:

| Smoke: | $CO_2$ |
|---|---|
| Trace | 11.0 |
| Trace | 10.6 |
| 0.5 | 10.8 |

From these data and the foregoing it will be apparent that my improved mechanical spinner represents an important and avantageous advance in the art making burners of the type herein-described more attractive for applications where smoke-free operation is critical.

Having thus described my invention, what is claimed is:

1. In a liquid fuel burner having a combustion chamber with a peripheral wall for receiving fuel, a spinner mounted centrally of the combustion chamber on a rotatable fuel-supplying hollow shaft for dispensing fuel to said wall, the spinner having a plurality of circular plates with open centers for mounting on said shaft, and apertures concentrically located about said centers, the improvement comprising;

(a) A first plate and a second plate, said first plate having a first side and a second side, the plate having a plurality of fan vanes on the first side, said vanes commencing generally radially at a point beyond the concentric apertures of the plate and extending beyond the periphery of the plate said vanes curved in the direction of spinner rotation and twisted at an angle with respect to the transverse plane of said first plate; and (b) spacer means axially mounted on the shaft at the second side of the first plate for spacing said plates, said spacer means having openings communicating with the shaft for the dispersal of fuel radially from between said plates.

References Cited
UNITED STATES PATENTS

| 1,468,118 | 9/1923 | MacLachlan | 158—77 |
| 1,698,760 | 1/1929 | Logan | 239—214.15 |
| 2,253,175 | 8/1941 | Gerquest | 158—77 |
| 2,641,189 | 6/1953 | Haugen | 158—77 |
| 2,721,102 | 10/1955 | Nissen | 239—214.15 |
| 3,039,700 | 6/1962 | Powell | 158—77 |
| 3,127,924 | 4/1964 | Downs | 158—77 |

FREDERICK L. MATTESON, JR., *Primary Examiner.*

E. G. FAVORS, *Assistant Examiner.*